United States Patent [19]

Moriyasu et al.

[11] Patent Number: 5,651,066

[45] Date of Patent: Jul. 22, 1997

[54] CIPHER KEY DISTRIBUTION SYSTEM EFFECTIVELY PREVENTING ILLEGITIMATE USE AND CHARGING OF ENCIPHERED INFORMATION

[75] Inventors: Kenji Moriyasu, Tokyo; Atsusi Kanai, Kanagawaken; Nobuhisa Miyake; Atsusi Terauchi, both of Tokyo; Hironobu Okuyama, Saitamaken, all of Japan

[73] Assignee: Nippon Telegraph and Telephone Corporation, Tokyo, Japan

[21] Appl. No.: 431,407

[22] Filed: Apr. 28, 1995

[30] Foreign Application Priority Data

Apr. 28, 1994 [JP] Japan .................... 6-091857

[51] Int. Cl.$^6$ .................................................. H04L 9/00
[52] U.S. Cl. ........................................ 380/21; 380/23
[58] Field of Search ........................ 380/21, 49, 28, 380/23, 25

[56] References Cited

U.S. PATENT DOCUMENTS

| | | | |
|---|---|---|---|
| 5,341,426 | 8/1994 | Barney et al. | 380/21 |
| 5,381,479 | 1/1995 | Gardeck et al. | 380/21 |
| 5,442,703 | 8/1995 | Kim et al. | 380/21 |
| 5,491,750 | 2/1996 | Bellare et al. | 380/21 |
| 5,517,567 | 5/1996 | Epstein | 380/21 |
| 5,544,245 | 8/1996 | Tsubakiyama | 380/21 |

*Primary Examiner*—David C. Cain
*Attorney, Agent, or Firm*—Banner & Witcoff, Ltd.

[57] ABSTRACT

A method and a system for cipher key distribution realizing an effective prevention of the illegitimate use and the illegitimate charging. A key request signal containing a first random number generated at each user terminal is transmitted from each user terminal to the key center, so as to indicate the cipher key required at each user terminal to the key center, and a terminal check signal containing a second random number generated at the key center is transmitted from the key center to each user terminal. Then, a terminal response signal containing the second random number and a value based on the first random number obtained according to the first random number generated at each user terminal and the second random number contained in the terminal check signal is transmitted from each user terminal to the key center, and the second random number and the value based on the first random number contained in the terminal response signal are checked at the key center, according to the second random number generated at the key center and the first random number contained in the key request signal, so as to confirm a legitimacy of an access from each user terminal. Then, a key distribution signal containing the cipher key requested by the key request signal is transmitted from the key center to each user terminal, only when the legitimacy of the access from each user terminal is confirmed.

20 Claims, 12 Drawing Sheets

CIPHER KEY DISTRIBUTION SYSTEM EFFECTIVELY PREVENTING ILLEGITIMATE USE AND CHARGING OF ENCIPHERED INFORMATION

BACKGROUND OF THE INVENTION

1. Field of the Invention

The present invention relates to a cipher key distribution system for distributing a cipher key from a key center to an unspecified number of user terminals through a public network.

2. Description of the Background Art

In a system formed by a key center and an unspecified number of user terminals connected with the key center through a public network, an enciphered application (AP) and a terminal program necessary for utilizing this system are initially distributed to an unspecified number of user terminals either through the network or by the use of information recording media. In such a system, in order to decipher the AP, the key center distributes a certain cipher key (referred hereafter as an AP key) to the user terminals.

Now, such a system ideally should satisfy the following conditions.

(1) A terminal program cannot be analyzed at the user terminal.

(2) An AP key obtained at the user terminal and a program for deciphering the AP are protected against an illegitimate use.

(3) A cipher scheme of the enciphered AP which is distributed to the terminal users and a cipher scheme for enciphering signals on communication lines have sufficient secrecy.

In the following, a use of the AP by a terminal user without using a connection with the key center through a legitimate protocol will be referred as an illegitimate use.

In general, for the condition (3), there are some propositions for a scheme which can guarantee a certain level of secrecy. However, for the conditions (1) and (2), there are cases in which it may be difficult to adopt a scheme relying on a specialized hardware for reasons such as that of cost, etc., and there is a need to provide a software based protection scheme. In such a software based protection scheme, however, a level of protection is a matter of relative significance because the analysis of the terminal program is still possible in principle, and the acquisition of the AP key obtained at the user terminal is also still possible.

In the above described system, depending on a protocol scheme used between the user terminal and the key center, the illegitimate use by a malicious terminal user is possible by means of the tapping of signal on the communication line between the key center and the user terminal.

For example, consider a conventional protocol scheme as shown in FIG. 1 in which the AP key is simply enciphered and distributed from the key center in response to the request for the AP key from the user terminal. This scheme will be referred hereafter as a conventional scheme A.

In this conventional scheme A, at the user terminal, the AP key request signal is produced by enciphering a user identifier such as user ID, pass word, etc., and an AP request data necessary for requesting a desired AP in a public key enciphering scheme E using a public key Ke that was distributed in advance as a cipher key, and transmitted to the key center. Then, at the key center, the received AP key request signal is deciphered by using a secret key Kd corresponding to the public key Ke, and an AP key distribution signal is produced by enciphering a decipher key (AP key) K1 of the requested AP in the public key enciphering scheme using a public key Ke' as a cipher key, and transmitted to the user terminal, while charging the fee for the requested AP to the user. Then, at the user terminal, the AP key distribution signal is deciphered by using a secret key Kd' corresponding to the public key Ke' that was distributed in advance, to obtain the AP key K1 of the desired AP. In this procedure, the transmission of the user identifier from the user terminal to the key center may be omitted.

Here, it is noted that the secret key enciphering scheme is a scheme in which the cipher key and the decipher key are the same, whereas the public key enciphering scheme is a scheme in which the cipher key and the decipher key are different. In the conventional scheme A described above, the public key enciphering scheme is used, but if the key can be shared secretly and safely in some manner at the beginning, it is also possible to consider a case of using the secret key enciphering scheme instead of the public key enciphering scheme.

In this conventional scheme A, even when the system satisfies all the conditions (1) to (3) noted above, it is still possible to make the illegitimate use of the AP as follows. Namely, the key center transmits the same AP key for the same AP, so that the same AP key distribution signal is going to be transmitted through the communication line every time the same AP is requested. Consequently, the illegitimate use is possible by recording the AP key distribution signal at a time of connecting with the key center once, and forming a dummy key center which reproduces the recorded AP key distribution signal. In other words, this is an illegitimate use of the AP by a fake key center using communication line tapping and recording.

This type of the illegitimate use is effective in a case of using the charging method in which each time of the use of the AP is charged separately. In such a case, the user terminal is going to receive the same AP key distribution signal for every time of the use of the same AP, so that it is possible to make the legitimate use in the first occasion in order to tap and record the AP key distribution signal, and input the recorded signal into the user terminal without connecting with the key center in the subsequent occasions.

Note however that, in this type of the illegitimate use, it is necessary to make the legitimate connection with the key center in the first occasion at least. For this reason, in a case of using the charging method in which the AP software itself is sold once and for all, this type of the illegitimate use is impossible, because in such a case, the same AP key will never be received again once the key for the AP is received from the key center at the user terminal.

On the other hand, in order to deal with this type of the illegitimate use, consider another conventional protocol scheme as shown in FIG. 2 in which the user terminal generates a random number and transmits that to the key center, and the key center enciphers and distributes the AP key according to the received random number. This scheme will be referred hereafter as a conventional scheme B.

In this conventional scheme B, at the user terminal, the AP key request signal is produced by enciphering a user identifier such as a user ID, pass word, etc., an AP request data necessary for requesting a desired AP, and a random number K3 generated at the terminal in a public key enciphering scheme E using a public key K2e that was distributed in advance as a cipher key, and transmitted to the key center. Then, at the key center, the received AP key request signal is deciphered by using a secret key K2d corresponding to the public key K2e, and an AP key distribution signal is produced by enciphering a decipher key (AP key) K1 of the requested AP in the secret key enciphering scheme E' using the random number K3 as a cipher key, and transmitted to the user terminal. Then, at the user terminal, the AP key distribution signal is deciphered by using the random number K3 generated earlier, to obtain the AP key K1 of the desired AP. In this procedure, the transmission of the user identifier from the user terminal to the key center may be omitted.

According to this conventional scheme B, a different signal flows through a communication line each time, so that, when the system satisfies the conditions (1) to (3) noted above, even if a third person intending the illegitimate use of the AP produces a dummy key center by tapping and recording the signal on the communication line and inputs the recorded signal into own terminal program, whether the inputted signal is enciphered by the same random number as that which was generated earlier at that user terminal or not is checked inside the user terminal, so that it is impossible to make the above described illegitimate use of the AP.

However, in this conventional scheme B, even when the conditions (1) to (3) noted above are satisfied, it is still possible to make the following illegitimate action which is different from the above described illegitimate use of the AP.

Namely, the third person can tap and record the signal from a legitimate user terminal to the key center, and then transmits the recorded signal to the key center later on. Here, if the public network used in this service is a type which does not have a function for confirming a calling side ID as in a case of the telephone network, it is possible to reproduce an information transmitted from the user terminal to the key center for the purpose of authenticating the calling side, by tapping and recording of the signal on the communication line in principle. When the AP key request signal from the user terminal is received, the key center transmits the AP key distribution signal corresponding to that, and charges the fee for the requested AP to the user when the requested AP is a chargeable one.

In this manner, the third person can makes the key center to transmit an unnecessary AP key to the legitimate user, and charge unnecessary fees to the legitimate user. In other words, this is an illegitimate charging by a fake user terminal using communication line tapping and recording.

Moreover, as already mentioned above, the conditions (1) and (2) noted above may not necessarily be satisfied completely all the times. In particular, in a case of using a protection based on the software technique, the analysis of the terminal software is often possible in principle albeit not so easy.

In such a case, the tapping and the recording of the signals on the communication line is the easiest thing one can do toward the program analysis. This is because when the meaning of the input output signals of the terminal program are analyzed, it is possible to reveal the function of the terminal program itself.

For example, for the conventional scheme B described above, the following procedure is predictable. First, the legitimate use of the AP is made, and the analysis of the meaning is carried out. The enciphered AP is disposed at hand of the terminal user from the beginning and it does not change in time, so that the AP key for deciphering the same AP also does not change in time. On the other hand, by means of the tapping of the communication line, it can be recognized that the received signal of the terminal program is different for the same AP each time, so that it can be recognized that the received signal is changed in some manner such as that which uses a random number.

Here, however, in order for the user terminal side to obtain the AP key by deciphering the received signal, it is necessary to learn a rule by which this constantly changing received signal is changing. In this regard, in the conventional scheme B, the signals are exchanged only once, so that it is evident that the user terminal side is specifying this rule for change at first. Consequently, by checking the rule for change specified by the terminal program, it is possible to obtain an information useful for the purpose of the illegitimate use.

In the conventional scheme B, when the terminal program is analyzed from such a viewpoint, even if the content of the signal itself cannot be revealed as it is enciphered, the meaning of each signal can be determined almost uniquely by conjecturing from the fact that the AP key itself does not change and the fact that the signals actually transmitted and received change. Thus, except for a case in which the analysis is impossible in principle, the difficulty in the analysis can be reduced considerably in this manner.

As described, a mere encipherment of the information on the communication line, and a simple variation of the signal on the communication line based on a random number are insufficient in coping with the problems of the illegitimate use and the illegitimate charging described above.

Furthermore, in a case of realizing a protection of the terminal program by means of software alone, without any hardware based protection, the analysis can be made difficult at best, and it remains possible in principle in many cases.

The user intending the illegitimate use of the AP can carry out the tapping and the recording of the signals on the communication line by using his own user terminal, for the purpose of analyzing the terminal program. In this case, by tapping and recording the signals between the user terminal and the key center for several times and simply comparing these recorded signals, an information useful for the purpose of analyzing the terminal program can be obtained.

Thus, in a situation in which the terminal program analysis or the illegitimate action using intermediate communication line tapping and recording by a malicious terminal user is possible, a mere encipherment of the signal on the communication line or a complication of the terminal program itself is insufficient as the protection against the illegitimate use, and it is necessary to deal with the problems of the illegitimate use and the illegitimate charging based on the production of the dummy key center or user terminal and the simplification of the analysis of the terminal program.

SUMMARY OF THE INVENTION

It is therefore an object of the present invention to provide a cipher key distribution system capable of realizing a safe cipher key distribution and an effective prevention of the illegitimate use and the illegitimate charging, by preventing the production of the dummy key center or user terminal while providing little hints for the analysis of the terminal program.

According to one aspect of the present invention there is provided a method of cipher key distribution in a system formed by a key center having a cipher key to be distributed and a plurality of user terminals connected with the key center through a public network, the method comprising the steps of: (a) transmitting a key request signal containing a first random number generated at each user terminal, from each user terminal to the key center, so as to indicate the cipher key required at each user terminal to the key center; (b) transmitting a terminal check signal containing a second random number generated at the key center, from the key center to each user terminal; (c) transmitting a terminal response signal containing the second random number and a value based on the first random number obtained according to the first random number generated at each user terminal and the second random number contained in the terminal check signal, from each user terminal to the key center; (d) checking the second random number and the value based on the first random number contained in the terminal response signal at the key center, according to the second random number generated at the key center and the first random number contained in the key request signal, so as to confirm a legitimacy of an access from each user terminal; and (e) transmitting a key distribution signal containing the cipher key requested by the key request signal, from the key center to each user terminal, only when the legitimacy of the access from each user terminal is confirmed at the step (d).

According to another aspect of the present invention there is provided a cipher key distribution system, comprising: a key center having a cipher key to be distributed; a plurality of user terminals connected with the key center through a public network; key request means, provided in each user terminal, for transmitting a key request signal containing a first random number generated at each user terminal, from each user terminal to the key center, so as to indicate the cipher key required at each user terminal to the key center; terminal check means, provided in the key center, for transmitting a terminal check signal containing a second random number generated at the key center, from the key center to each user terminal; terminal response means, provided in each user terminal, for transmitting a terminal response signal containing the second random number and a value based on the first random number obtained according to the first random number generated at each user terminal and the second random number contained in the terminal check signal, from each user terminal to the key center; check means, provided in the key center, for checking the second random number and the value based on the first random number contained in the terminal response signal, according to the second random number generated at the key center and the first random number contained in the key request signal, so as to confirm a legitimacy of an access from each user terminal; and key distribution means, provided in the key center, for transmitting a key distribution signal containing the cipher key requested by the key request signal, from the key center to each user terminal, only when the legitimacy of the access from each user terminal is confirmed by the check means.

According to another aspect of the present invention there is provided a cipher key distribution system, comprising: a key center having a cipher key to be distributed; and a plurality of user terminals connected with the key center through a public network; wherein each user terminal includes: means for transmitting a key request signal to the key center, receiving a terminal check signal from the key center in response to the key request signal, transmitting a terminal response signal to the key center in response to the terminal check signal, and receiving a key distribution signal from the key center in response to the terminal response signal; means for generating a first random number; means for producing the key request signal containing the first random number, for indicating the cipher key required at each user terminal; means for obtaining a second random number from the terminal check signal received from the key center; means for obtaining a value based on the first random number; means for producing the terminal response signal containing the second random number contained in the terminal check signal and the value based on the first random number; and means for obtaining the cipher key from the key distribution signal received from the key center; and wherein the key center includes: means for receiving the key request signal from each user terminal, transmitting the terminal check signal to each user terminal in response to the key request signal, receiving the terminal response signal from each user terminal in response to the terminal check signal, and transmitting the key distribution signal to each user terminal in response to the terminal response signal; means for obtaining the first random number from the key request signal received from each user terminal; means for generating the second random number; means for producing the terminal check signal containing the second random number; means for obtaining the value based on the first random number and the second random number from the terminal response signal received from each user terminal; means for checking the second random number and the value based on the first random number contained in the terminal response signal, according to the second random number generated at the key center and the first random number contained in the key request signal, so as to confirm a legitimacy of an access from each user terminal; and means for producing the key distribution signal containing the cipher key requested by the key request signal, only when the legitimacy of the access from each user terminal is confirmed by said means for checking.

Other features and advantages of the present invention will become apparent from the following description taken in conjunction with the accompanying drawings.

DETAILED DESCRIPTION OF THE PREFERRED EMBODIMENTS

Now, one embodiment of the cipher key distribution system according to the present invention will be described in detail.

Figure 1:
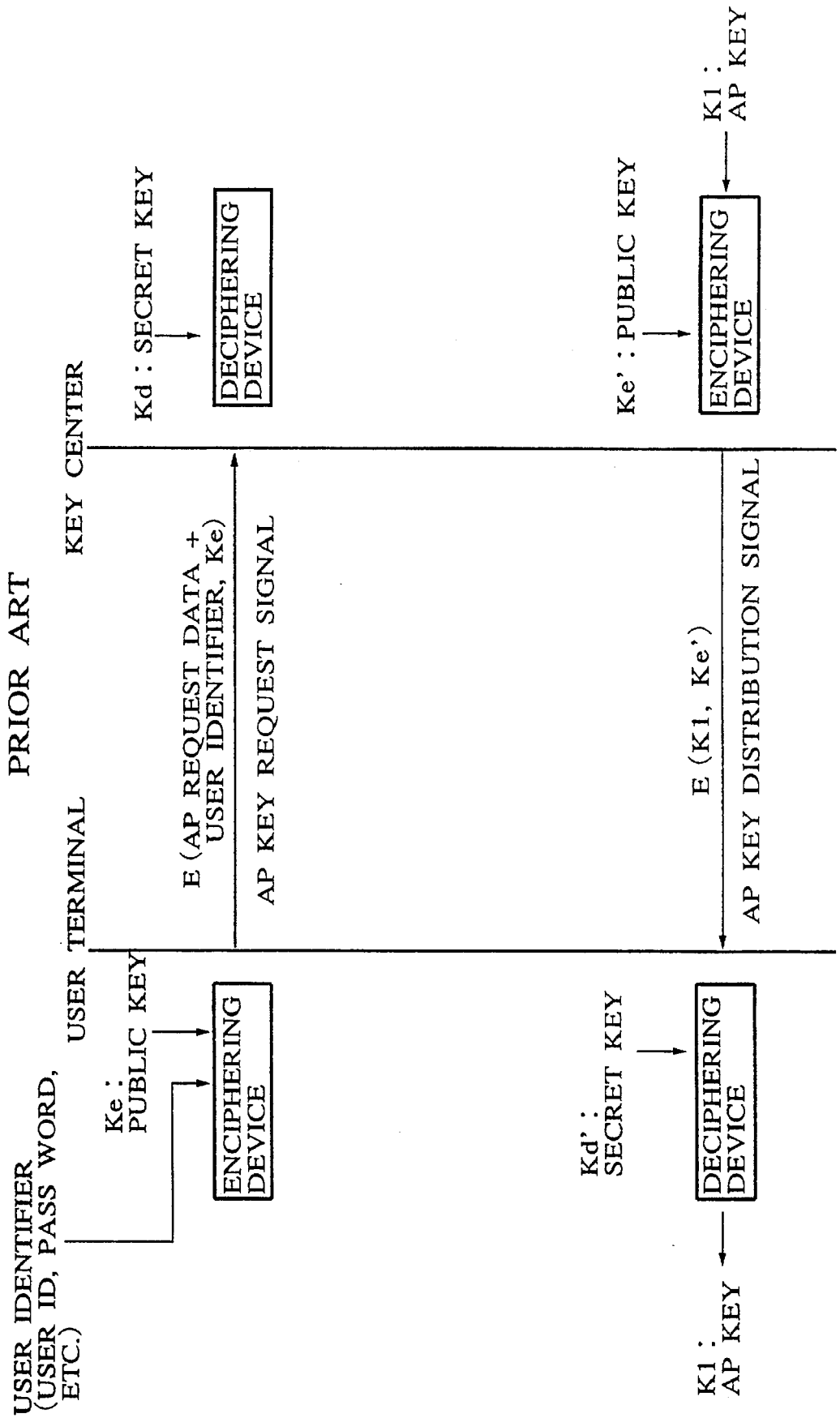
FIG. 1 is a chart showing a flow of processing between a user terminal and a key center in one example of a conventional cipher key distribution scheme.
Figure 2:
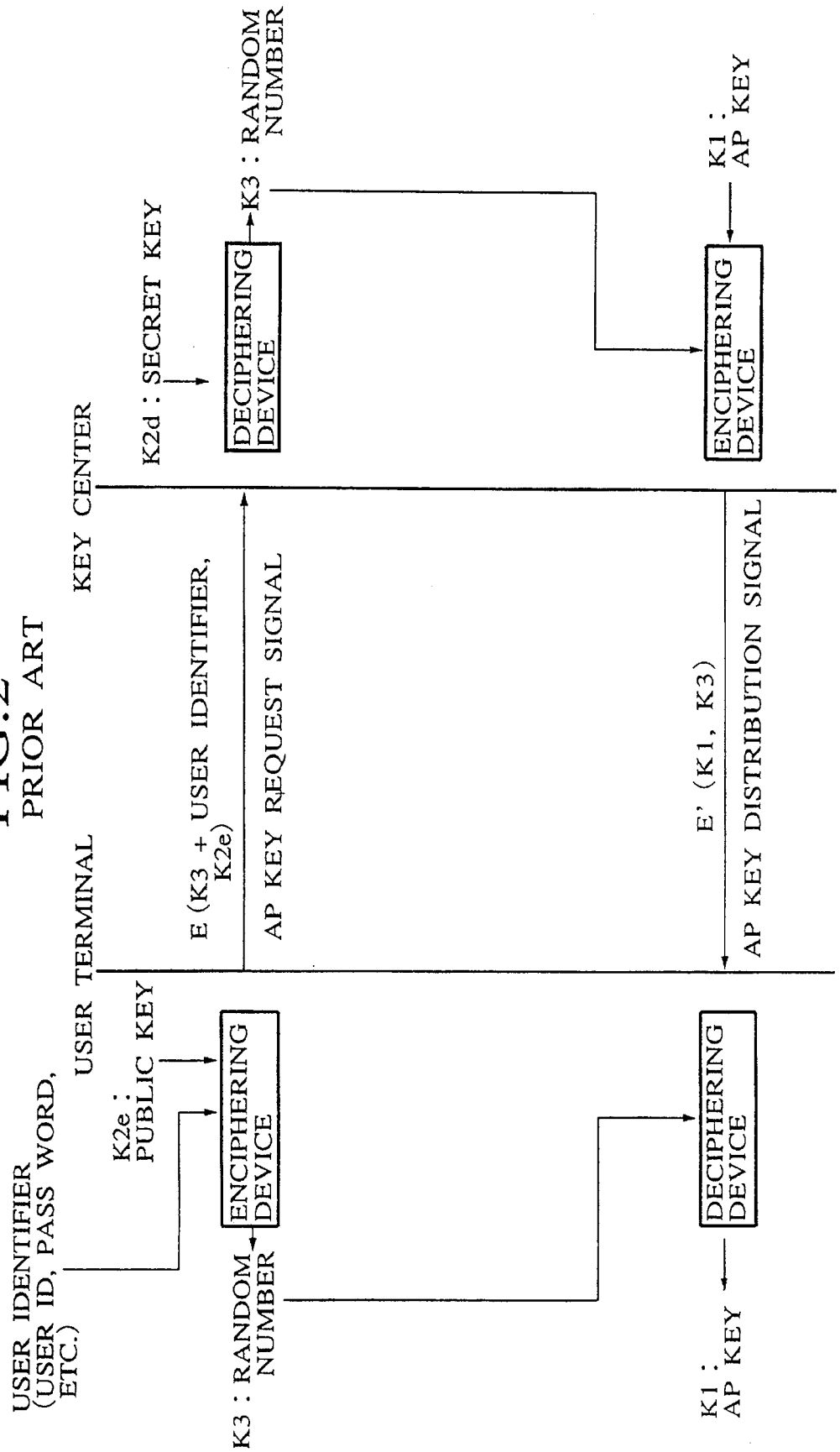
FIG. 2 is a chart showing a flow of processing between a user terminal and a key center in another example of a conventional cipher key distribution scheme.
Figure 3:
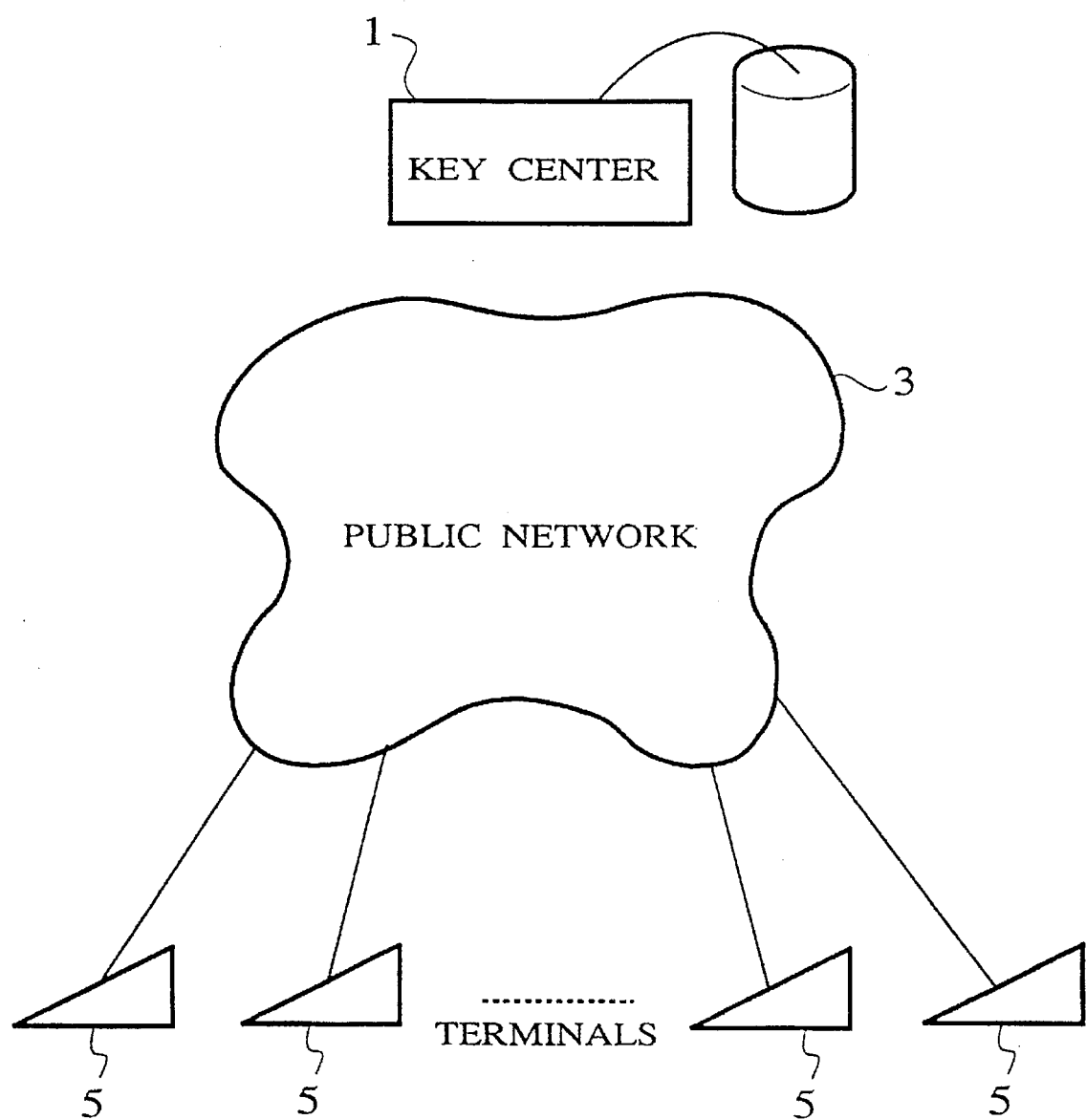
FIG. 3 is a schematic block diagram showing an overall configuration of one embodiment of a cipher key distribution system according to the present invention.

In this embodiment, the cipher key distribution system has an overall configuration as shown in FIG. 3, which comprises a key center 1 having a cipher key (referred hereafter as AP key) to be distributed, and a plurality of user terminals 5 connected with the key center 1 through a public network 3. In this system of FIG. 3, when the AP key becomes necessary at the user terminal 5, the user terminal 5 is connected with the key center 1 through the public network 3 so as to receive the distribution of the AP key from the key center 1.

Figure 4:
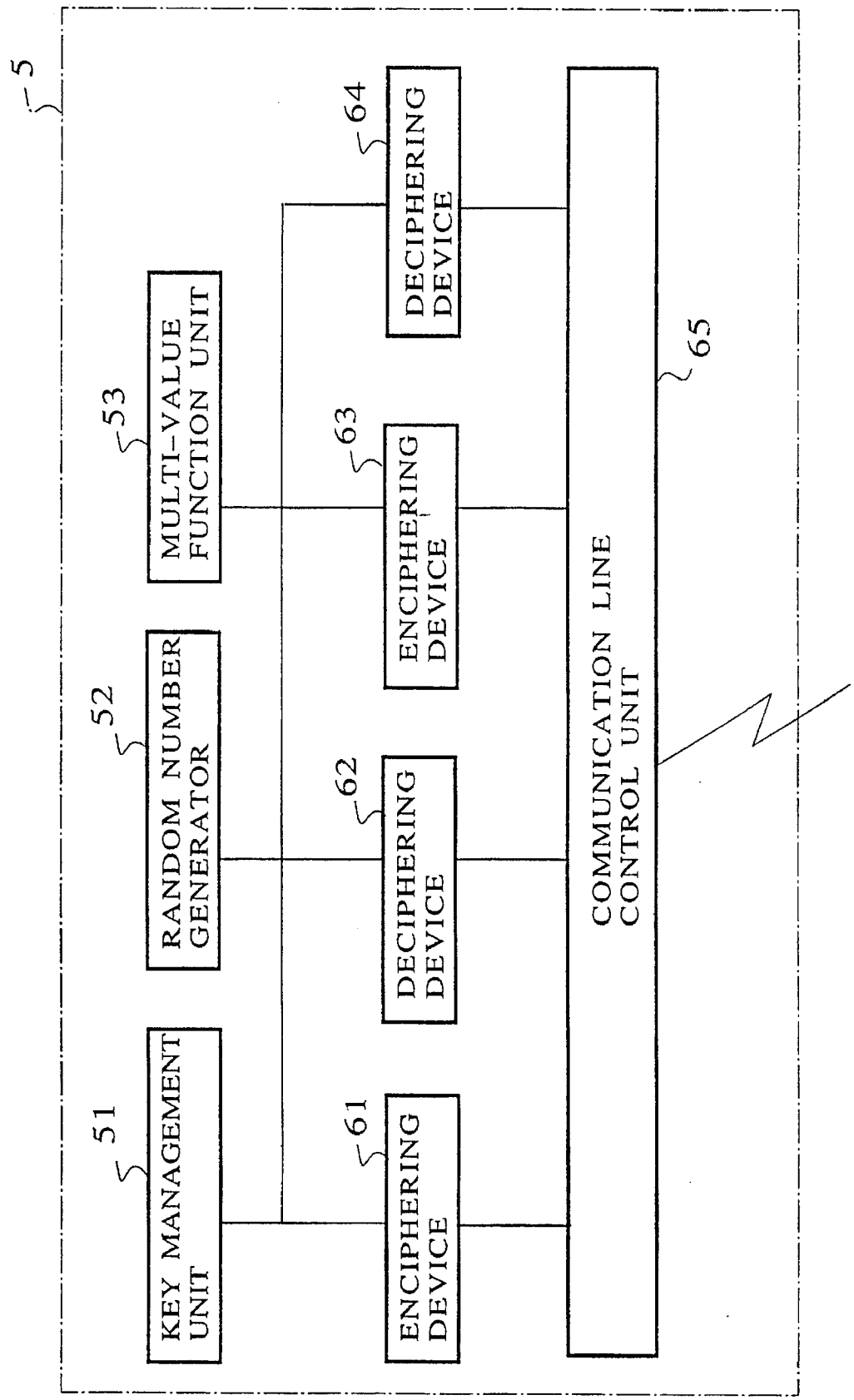
FIG. 4 is a block diagram of a user terminal in the cipher key distribution system of FIG. 3.

Each user terminal 5 has a configuration as shown in FIG. 4, which comprises a key management unit 51, a random number generator 52, a multi-value function unit 53, an enciphering device 61, a deciphering device 62, and an enciphering device 63, a deciphering device 64, all of which are mutually connected, and a communication line control unit 65 which is connected with the enciphering and deciphering devices 61, 62, 63, and 64 on one hand and with the public network 3 on the other hand. Functions of these elements of the user terminal 5 will be described in detail below.

Figure 5:
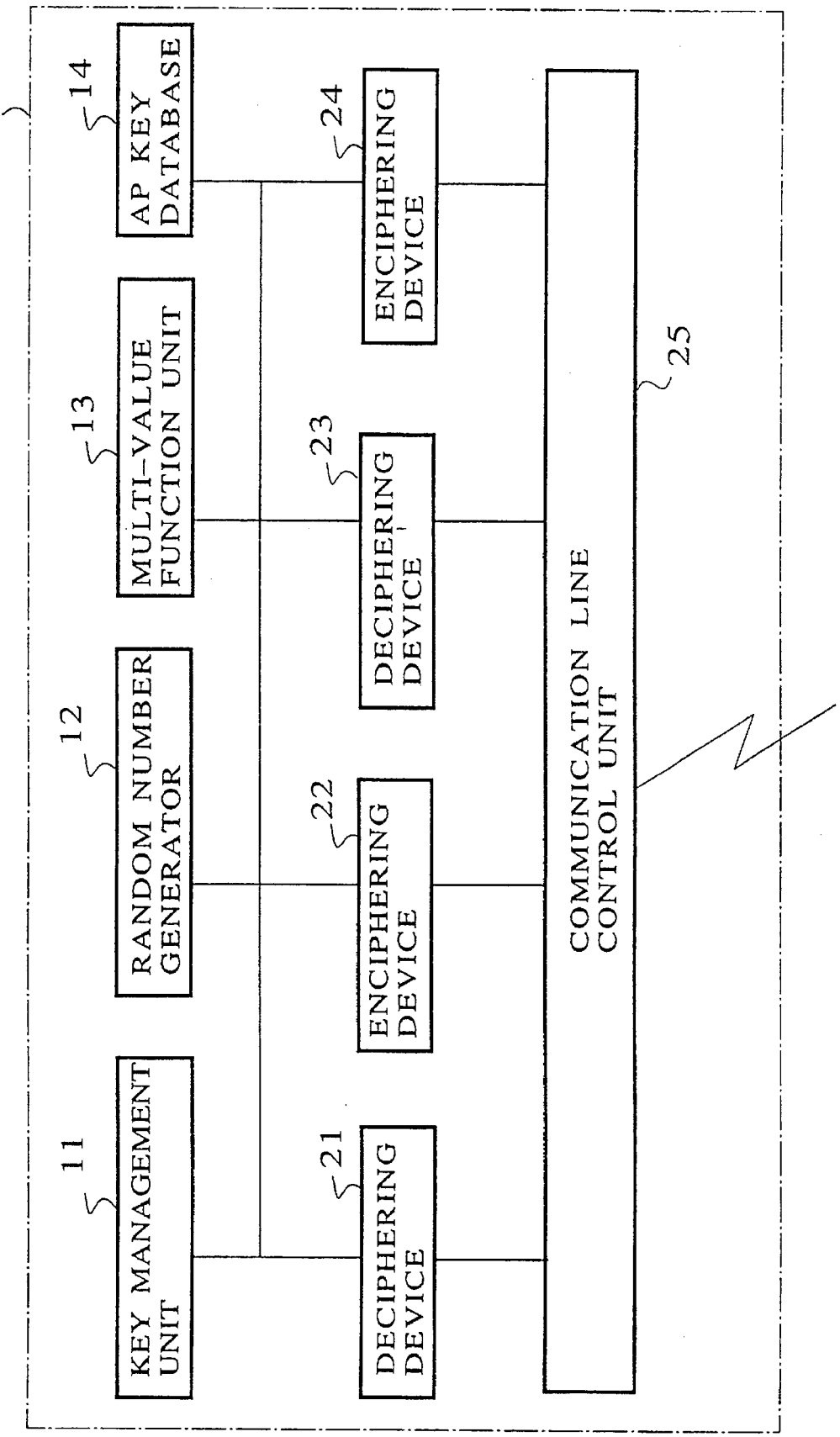
FIG. 5 is a block diagram of a key center in the cipher key distribution system of FIG. 3.

Also, the key center 1 has a configuration as shown in FIG. 5, which comprises a key management unit 11, a random number generator 12, a multi-value function unit 13, an AP key database 14, a deciphering device 21, an enciphering device 22, a deciphering device 23, and an enciphering device 24, which are mutually connected, and a communication line control unit 25 which is connected with the deciphering and enciphering devices 21, 22, 23, and 24 on one hand and with the public network 3 on the other hand. Functions of these elements of the user terminal 5 will be described in detail below.

Figure 6:
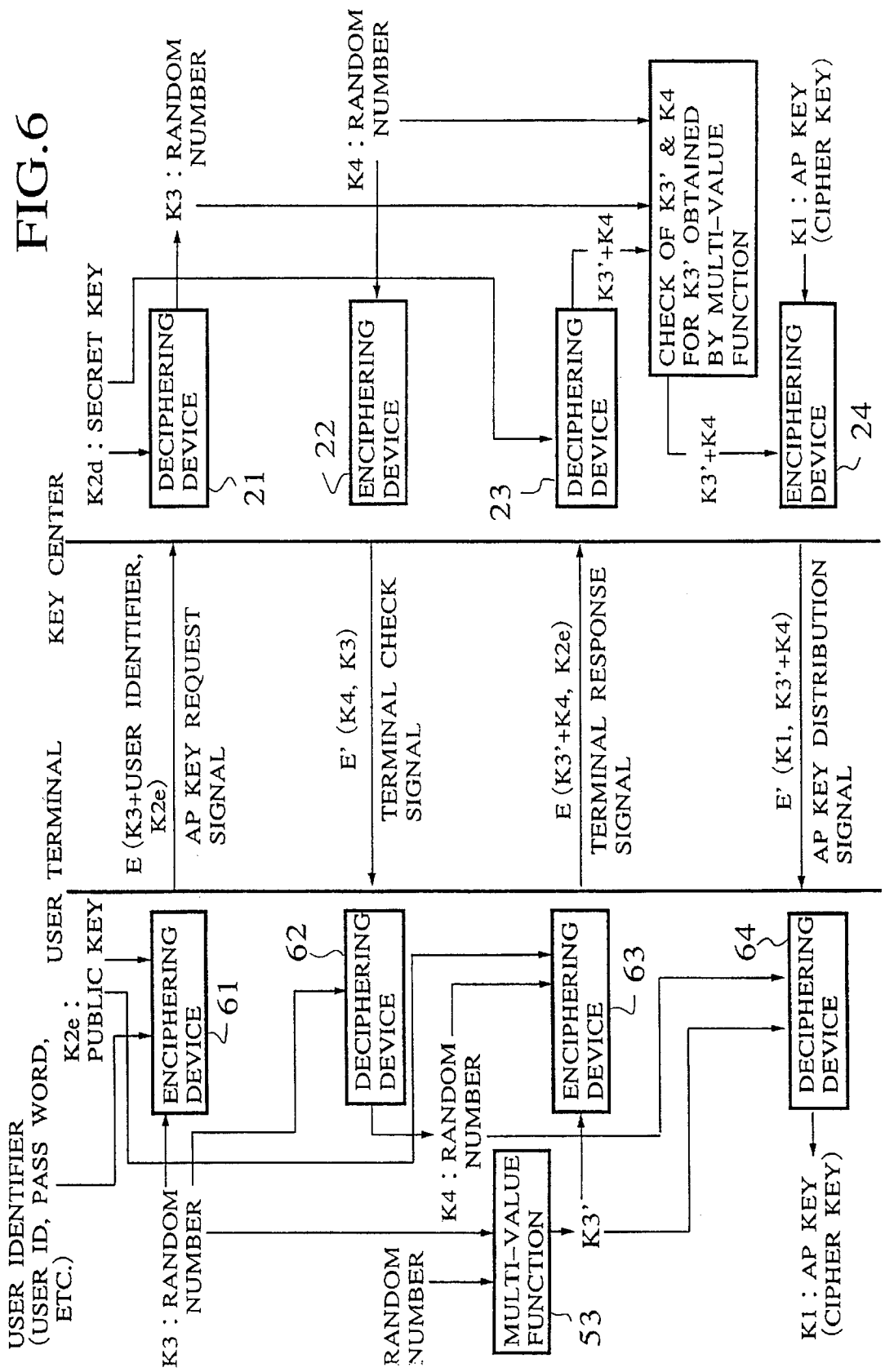
FIG. 6 is a chart showing a flow of processing between a user terminal and a key center in the cipher key distribution system of FIG. 3.

FIG. 6 shows a flow of processing among the user terminal 5 and the key center 1 in this embodiment. In FIG. 6, a symbol E(X, Y) indicates a signal in which X is enciphered in the public key enciphering scheme E using a key Y, and a symbol E'(X, Y) indicates a signal in which X is enciphered in the secret key enciphering scheme E' using a key Y. In this embodiment, it is assumed that the user terminal 5 has a public key K2e from the beginning.

Figure 7:
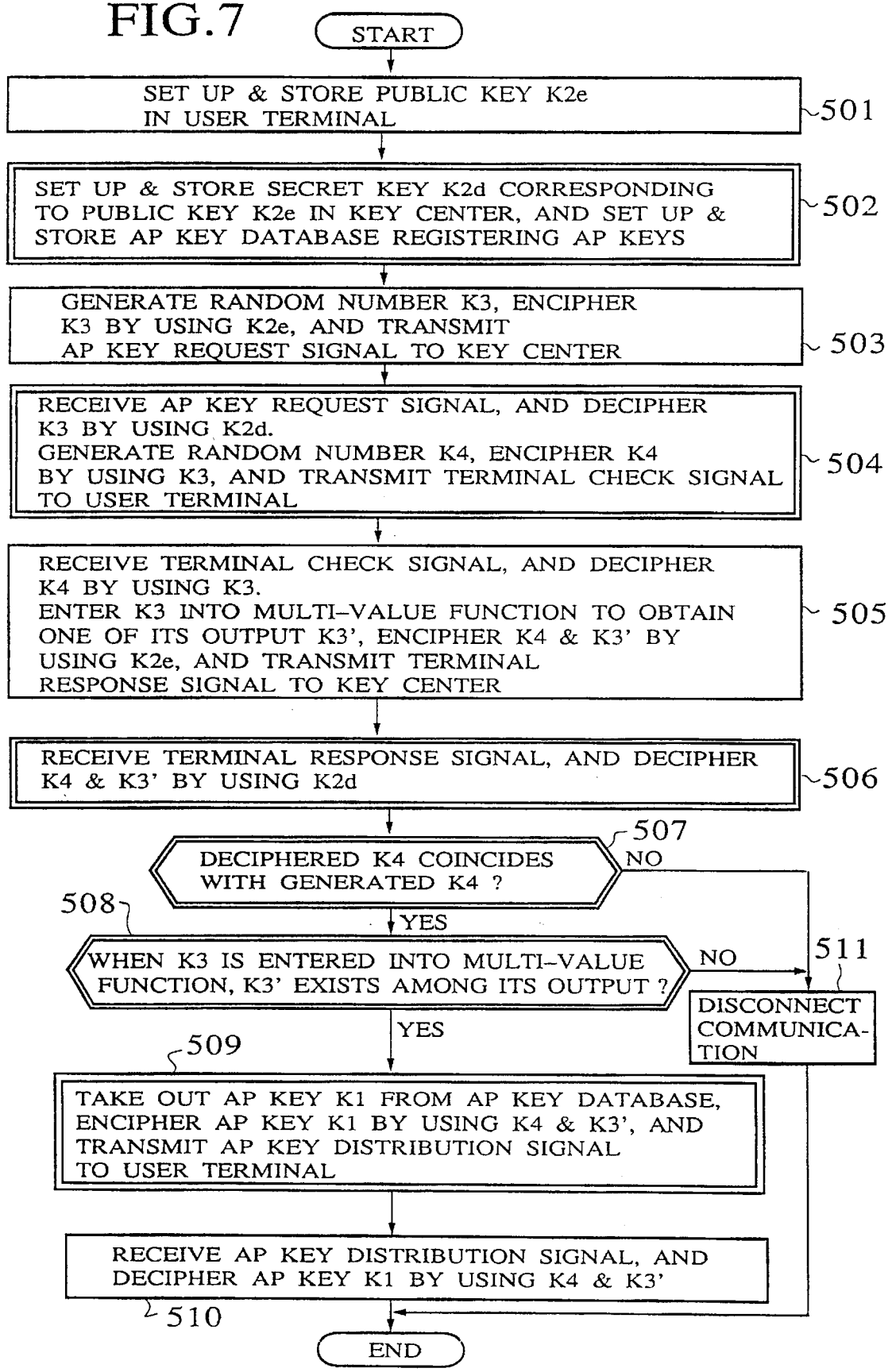
FIG. 7 is a flow chart of the operation at a user terminal and a key center in the cipher key distribution system of FIG. 3.

Now, the flow of processing shown In FIG. 6 will be described according to the flow chart of FIG. 7. In this flow chart of FIG. 7, steps indicated by double lined boxes belong to the processing at the key center 1, while steps indicated by single lined boxes belong to the processing at the user terminal 5.

First, in the initial state, the user terminal 5 sets up and stores the public key K2e in the key management unit 51 (step 501), while the key center 1 sets up and stores the secret key K2d corresponding to the public key K2e in the key management unit 11 as well as the AP keys to be distributed to the user terminals 5 in the AP key database 14 (step 502).

When the user terminal 5 requires the AP key K1, a random number K3 is generated at the random number generator 52, and a signal E(K3, K2e) obtained by enciphering the generated random number K3 by using the public key K2e stored in the key management unit 51 at the enciphering device 61 is transmitted as an AP key request signal from the communication line control unit 65 to the key center 1 (step 503).

At this point, if the user identifier such as a user ID, pass word, or both of them, etc. is also required, it is enciphered and transmitted along with the random number K3, but this transmission of the user Identifier may be omitted.

In the key center 1 which received the AF key request signal the random number K3 is deciphered by using the secret key K2d stored in the key management unit 11 at the deciphering device 21. Then, a random number K4 is generated at the random number generator 12, and a signal E'(K4, K3) obtained by enciphering the generated random number K4 by using the deciphered random number K3 at the enciphering device 22 is transmitted as a terminal check signal from the communication line control unit 25 to the user terminal 5 (step 504).

Here, which AP key of which AP is requested by the user terminal 5 is indicated in the AP key request signal described above, and the key center 1 can recognize this information from the received AP key request signal.

In the user terminal 5 which received the terminal check signal, the random number K4 is deciphered by using the random number K3 at the deciphering device 62. In addition, this random number K3 is inputted into the multi-value function unit 53, and an arbitrary one of its outputs K3' is obtained. Then, a signal E(K3'+K4, K2e) obtained by enclphering the deciphered random number K4 and multi-value function output K3' by using the public key K2e at the enciphering device 63 is transmitted as a terminal response signal to the key center 1 (step 505).

In the key center 1 which received the terminal response signal, the random number K4 and the multi-value function output K3' are deciphered by using the secret key K2d at the deciphering device 23 (step 506). Then, whether the deciphered random number K4 coincides with that which was generated earlier at the random number generator 12 or not is checked (step 507). If it coincides, the random number K3 is inputted into the multi-value function unit 13 and whether the deciphered multi-value function output K3' exists among a set of outputs produced by the multi-value function unit 13 or not is checked (step 508). If it exists, i.e., when these two conditions of the steps 507 and 508 are satisfied, it is Judged as a legitimate access from a proper user terminal, so that the requested AP key K1 is taken out from the AP key database 14, and a signal E'(K1, K3'+K4) obtained by enciphering this AP key K1 by using the random number K4 and the multi-value function output K3' at the enciphering device 24 is transmitted as an AP key distribution signal to the user terminal 5 8step 509).

On the other hand, when either one of the two conditions of the steps 507 and 508 is not satisfied, it is judged as an illegitimate access from an improper user terminal, so that the communication is disconnected (step 511).

Finally, in the user terminal 5 which received the AP key distribution signal, the AP key K1 is obtained by deciphering the received AP key distribution signal by using the random number K4 and the multi-value function output K3' at the deciphering device 64 (step 510).

Now, the effect of the cipher key distribution system of this embodiment will be described.

As already mentioned above, in a situation in which the illegitimate action using intermediate communication line tapping and recording by a malicious terminal user is possible, a mere encipherment of the signal on the communication line is insufficient as the protection against the illegitimate use. In view of this fact, the effect of the present invention is to prevent the illegitimate charging by the fake user terminal using the tapping and recording of the signals on the intermediate communication line, as well as a meaning analysis of the signals which can be a powerful and easily obtainable supporting material for the analysis of the terminal program.

In the system which satisfies the conditions (1) to (3) noted above, suppose that a third person intends to make the illegitimate charging to a certain terminal user by means of the fake user terminal using the tapping and recording of the signals on the communication line. Namely, the third person taps and records the signals on the communication line while this terminal user carries out a normal legitimate use of the AP. Then, the third person transmits the output signal of the terminal user side to the key center again later on.

However, according to this embodiment, the signals are exchanged twice for each use of the AP, so that it is necessary for the third person to transmits two signals in an order, but the key center 1 generates a random number each time, so that the random number at a time the signal is recorded by the third person will be different from the random number at a time the illegitimate charging is attempted, and it is possible for the key center 1 to notice that some illegitimate action has been attempted.

Next, in the system which satisfies the condition (3) noted above, but not the conditions (1) and (2) completely, suppose that the terminal user intending to make the meaning analysis of the signals carried out a normal legitimate use of the AP several times, and attempted to tap and record the signals on the communication line to analyze them.

However, according to this embodiment, the signals are exchanged twice, so that it is impossible to know which information is carried by which signal, before analyzing the terminal program itself. Also, as the condition (3) is satisfied, it is also impossible to decipher the signal itself. Consequently, the meaning of the signal cannot be determined uniquely by a simple tapping of the communication line, and therefore the difficulty in the analysis of the terminal program cannot be reduced.

Also, according to this embodiment, the multi-value function output K3' is generated from the random number K3. By means of this, the multi-value function output K3' which is transmitted from the user terminal 5 to the key center 1 as the terminal response signal will not be uniquely determined in total dependence to the random number K3 so that even when the random number K3 is identified in some manner, and the signal E(K4, K3) is identified by the recording, the terminal response signal E(K3'+K4, K2e), which is the second output of the terminal program, cannot be identified. On the other hand, the key center 1 has the same multi-value function, so that it is possible to check whether the multi-value function output K3' obtained from the received terminal response signal E(K4+K3', K2e) was generated from the random number K3 or not, and therefore it is possible to confirm that the currently communicating terminal program is a proper one originally provided.

Here, the multi-value function is a function which outputs a plurality of fixed values with respect to one input. Thus, when the same value is inputted, a set of the output values is always identical. For example, it is possible to use a function F by which a certain number r ($0 \leq r \leq 99$) is put in correspondence with a set of all numbers r' ($0 \leq r' \leq 9999$) for which the residue with respect to N=100 is equal to r. In order to apply this function F to the above described embodiment, it suffices to set r=K3, and r'=K3'.

As a concrete example, in a case of r=38, the outputs of the multi-value function will be a set F(38)={38, 138, . . . , 9938}. It suffices for the user terminal 5 to transmits just one of these outputs to the key center 1, so that it actually suffices to generate a random number R ($0 \leq R \leq 99$), and calculate r'=100R+r in this case. For instance, if R=22, r'=2238=(100× 22)+38 will be transmitted.

At the key center 1 side, it suffices to carry out the mod 100 calculation for the received r', and the comparison with r already received earlier, to see if r=r'. If r'=2238 is actually received, r'=2238=38 (mod 100), so that in comparison with r=38 already received earlier, it can be confirmed that r=r' indeed.

It is to be noted that the above described embodiment can be modified in the following manners.

Namely, it is possible to realize modified embodiments by changing the data to be used as an enciphering key or by changing the data to be enciphered.

Figure 8:
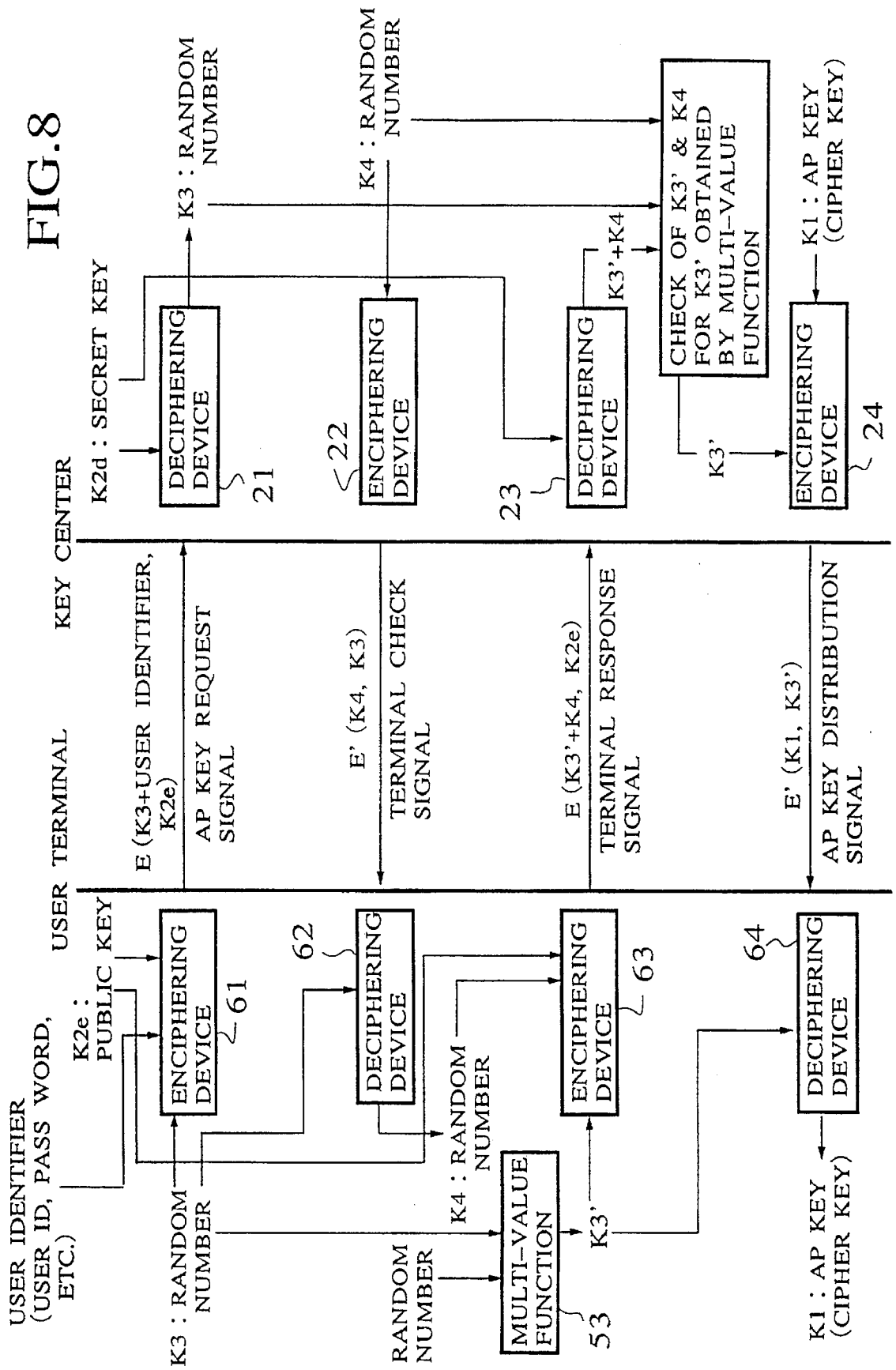
FIG. 8 is a chart showing a flow of processing to be carried out between a user terminal and a key center in one modification of the cipher key distribution system of FIG. 3.

In particular, after the key center 1 and the user terminal 5 shared the same key information, it becomes possible to carry out the communication by using the secret key enciphering scheme in which the enciphering key and the deciphering key are the same, so that at the step of transmitting the AP key distribution signal in FIG. 6, in enciphering the AP key K1 and transmitting it from the key center 1 to the user terminal 5, K3'+K4 used as an enciphering key for enciphering the AP key K1 can be replaced by K3' alone, K4 alone, or K3 alone. For instance, as shown in FIG. 8, the AP key distribution signal can be obtained by enciphering the AP key K1 by using K3' alone as an enciphering key, instead of K3'+K4 used in FIG. 6. Similarly, the embodiment using K4 alone or K3 alone can also be realized in obvious manners.

Figure 9:
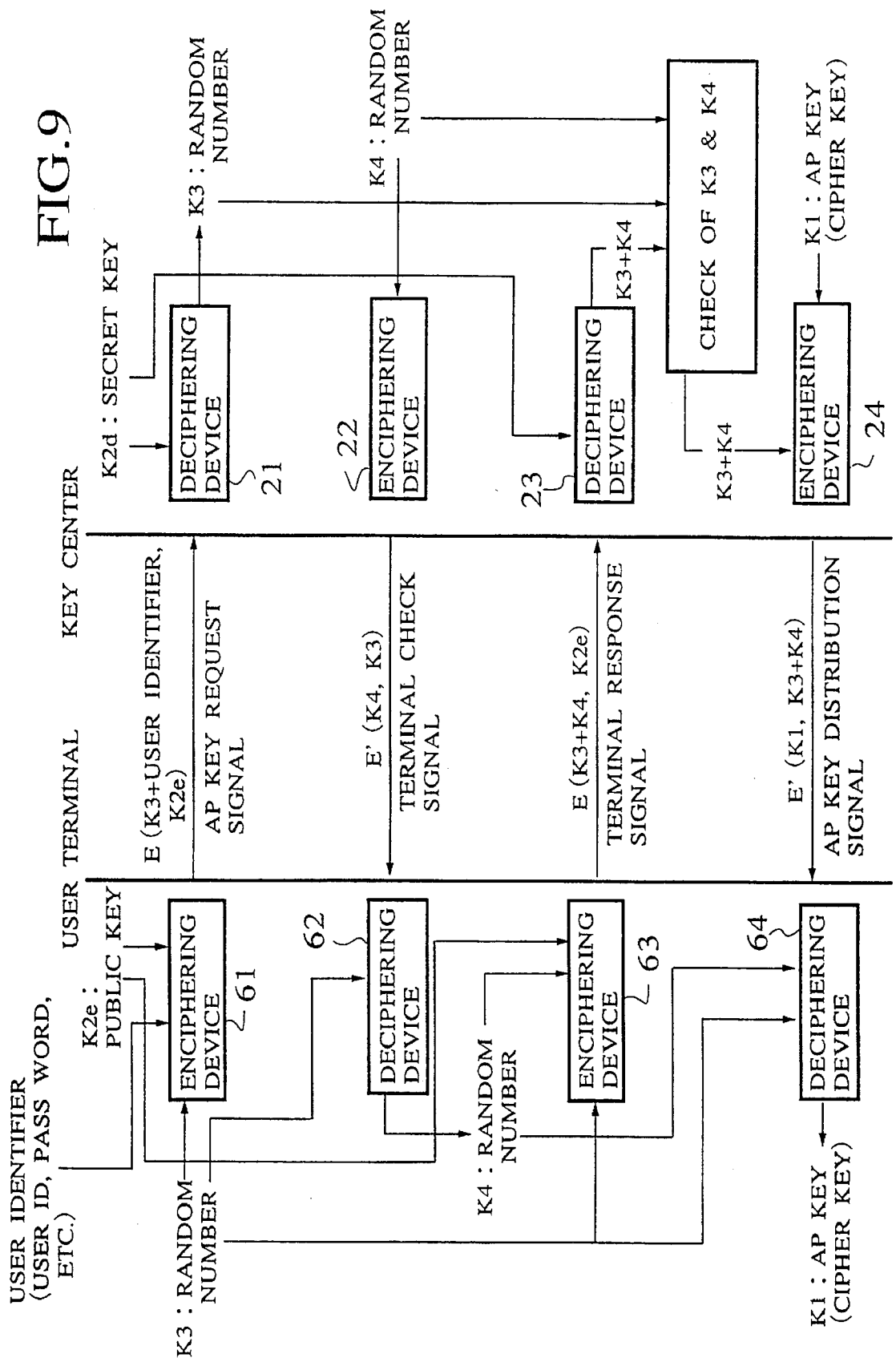
FIG. 9 is a chart showing a flow of processing to be carried out between a user terminal and a key center in another modification of the cipher key distribution system of FIG. 3.

On the other hand, in order to confirm that the program operating on the user terminal 5 is a program from which an access is expected at the key center 1 side, it is also possible to use means other than the multi-value function. For example, the confirmation at the key center 1 side can be done by embedding some secret character string in the terminal program in advance, and returning that secret character string from the user terminal 5 to the key center 1. In this case, the multi-value function output K3' used in FIG. 6 is obviously unnecessary, so that as shown in FIG. 9, the random number K3 can be used instead of the multi-value function output K3' in the terminal response signal and the AP key distribution signal.

In addition, it is also possible to realize modified embodiments by changing a combination of the public key enciphering scheme E and the secret key enciphering scheme E' used in enciphering the signals between the key center 1 and the user terminal 5.

Figure 10:
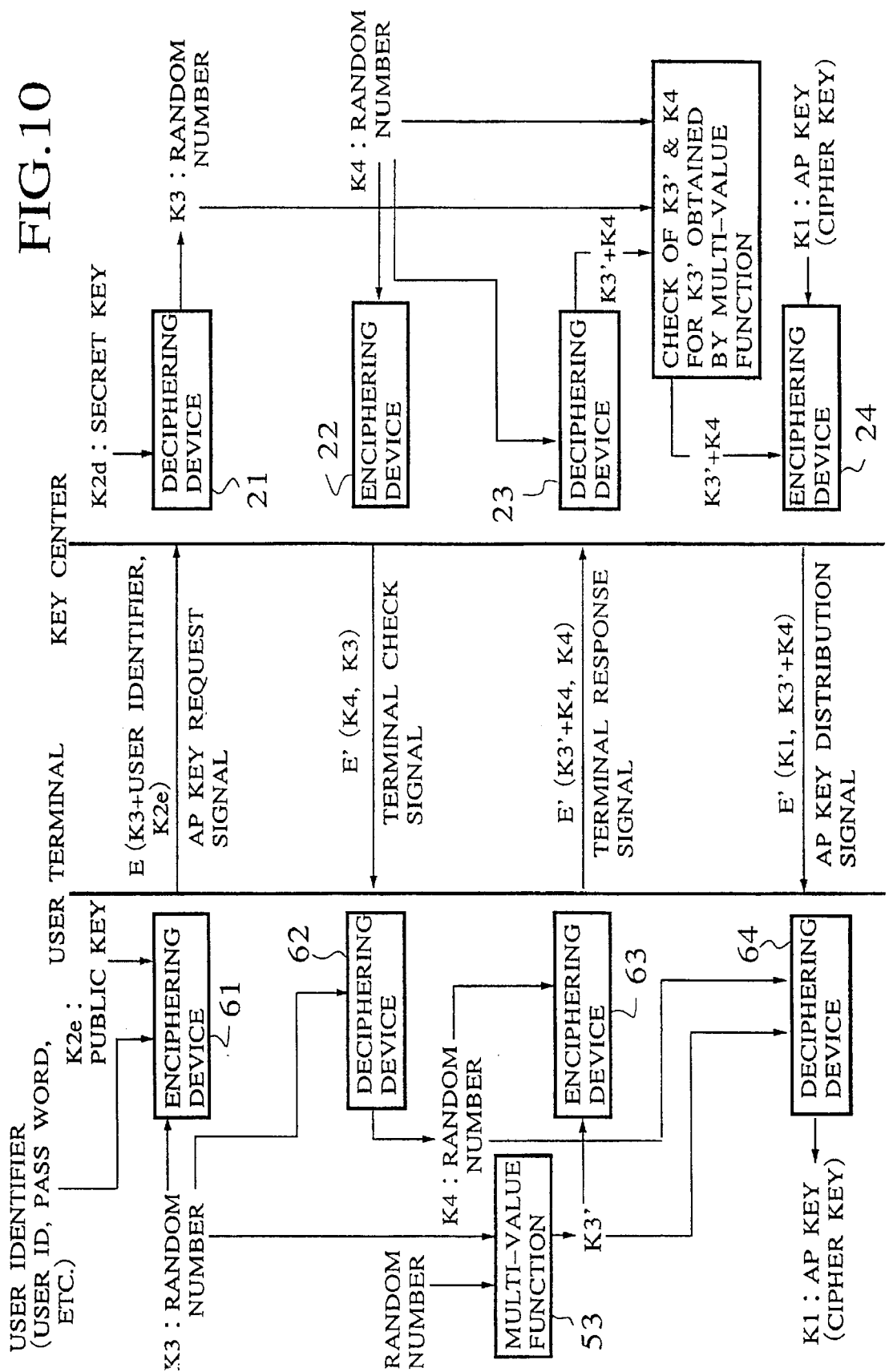
FIG. 10 is a chart showing a flow of processing to be carried out between a user terminal and a key center in another modification of the cipher key distribution system of FIG. 3.

For example, in a case the enciphering and/or deciphering speed is faster for the secret key enciphering scheme E' than for the public key enciphering scheme E, as shown in FIG. 10, it is possible to replace the use of the public key enciphering scheme E utilized in obtaining the enciphered terminal response signal E(K3'+K4, K2e) in FIG. 6 by a secret key enciphering scheme E' using the random number K4 as a key to obtain the enciphered terminal response signal E'(K3'+K4, K4), such that the public key enciphering scheme E is used for enciphering the first AP key request signal from the user terminal 5 to the key center 1 alone, and the secret key enciphering scheme E' is used for enciphering all the other signals. In this case, it is unnecessary to supply the public key K2e to the enciphering device 63 on the user terminal 5 side, while it is necessary to supply the random number K4 generated at the key center 1 to the deciphering device 23 instead of the secret key K2d on the key center 1 side, as indicated in FIG. 10.

Next, an exemplary software sales system utilizing the cipher key distribution method of the present invention as described in the above embodiment will be described.

In this software sales system, a software to be sold is enciphered and stored in a CD-ROM. Then, a user who purchased this CD-ROM installs this CD-ROM into his own user terminal and selects the desired software. After the selection, the user calls up the key center from the user terminal through a modem device, and receives the key for deciphering the selected software in exchange to the payment of the fee, such that the desired software can be deciphered and used thereafter.

Figure 11:
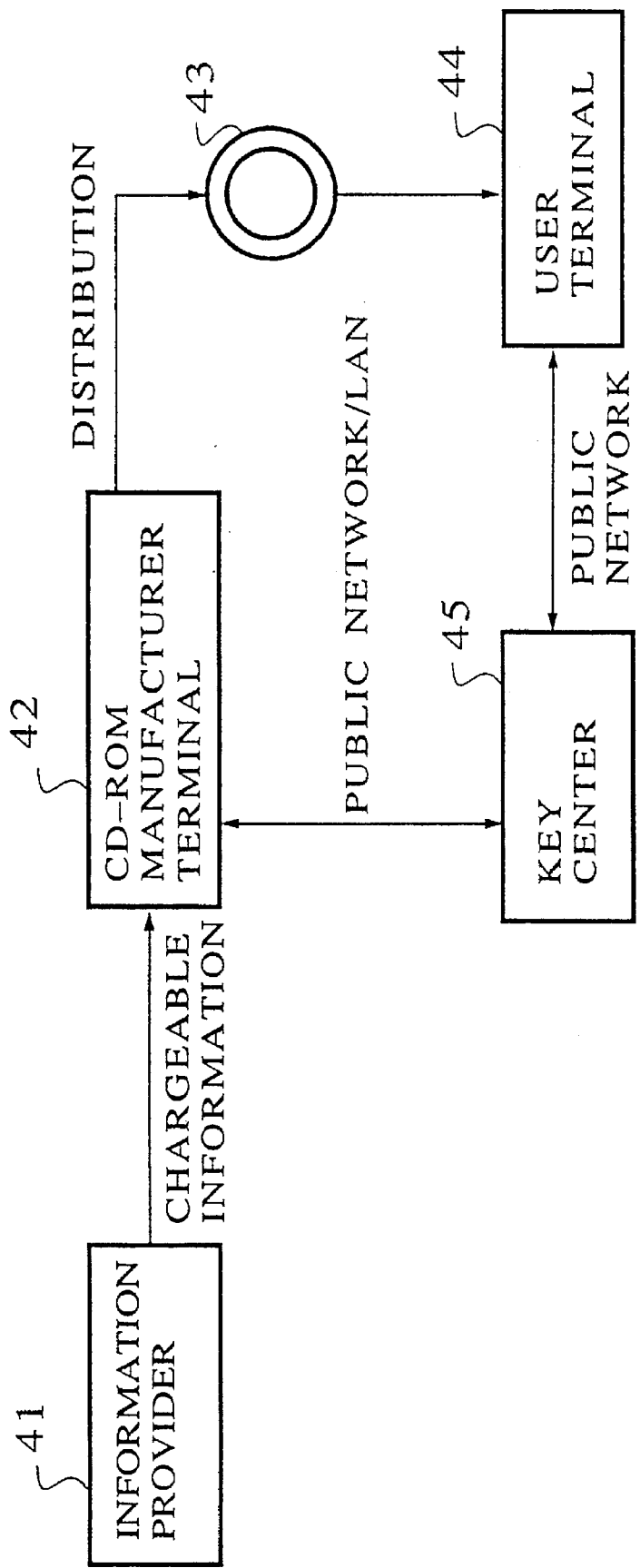
FIG. 11 is a schematic block diagram of a software sales system utilizing the cipher key distribution method according to the present invention.

This software sales system has an overall configuration as shown in FIG. 11, in which a user terminal 44 and a key center 45 are connected with each other through a public network. Also, a CD-ROM manufacturer terminal 42 and the key center 45 are connected with each other through a public network or LAN. A chargeable information is provided from an information provider 41 to the CD-ROM manufacturer terminal 42, and the CD-ROM manufacturer then manufactures a CD-ROM 43 in which this chargeable information is enciphered and stored at the CD-ROM manufacturer terminal 42, and distributes it in the market.

Figure 12:
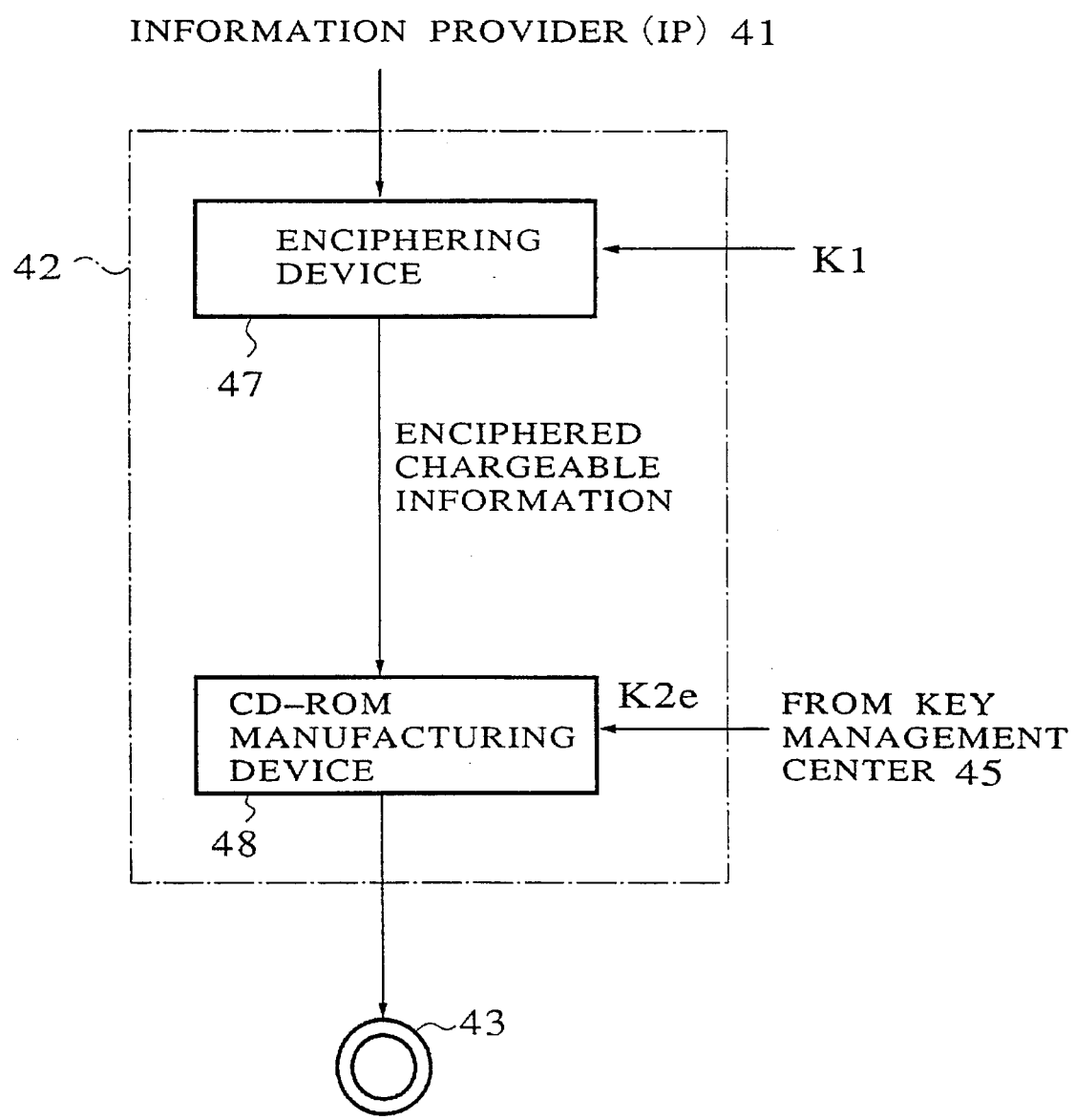
FIG. 12 is a block diagram of a CD-ROM manufacturer terminal in the software sales system of FIG. 10.

The CD-ROM manufacturer terminal 42 has a schematic configuration as shown In FIG. 12, which comprises an enciphering device 47 and a CD-ROM manufacturing device 48. The enciphering device 47 enciphers all the softwares of the chargeable information received from the information provider (IP) 41 one by one, by using a different AP key K1 for each software. At this point, a unique identification number ID is assigned to each software. The key center 45 manages an information indicating correspondences between the identification numbers assigned to the softwares and the AP keys used in enciphering the softwares. The CD-ROM manufacturing device 48 manufactures the CD-ROM 43 by storing the enciphered softwares outputted from the enciphering device 47, a public key K2e provided from the key center 45, and a sales guidance program to be activated by the user in order to select the desired software, altogether in one CD-ROM.

Now, a procedure for manufacturing the CD-ROM will be described in further detail.

When the information provider (IP) 41 hands over the softwares to be sold to the CD-ROM manufacturer, this CD-ROM manufacturer assigns a unique ID to each software received from the information provider 41.

Then, each software is separately enciphered by using an AP key K1 in correspondence to the ID of each software, and stored in the CD-ROM 43. (Note that all the AP keys are represented by the same symbol K1 here for the sake of simplicity, although there are as many different AP keys as a number of softwares to be enciphered.) At the same time, the CD-ROM manufacturer also produces a correspondence table between the IDs of the softwares and the AP keys used in enciphering these softwares. Then, the manufactured CD-ROM 43 is distributed in the market, while the correspondence table is sent to the key center 45.

Now, a procedure for purchasing the software stored in the distributed CD-ROM 43 will be described in further detail.

The user at his own user terminal 44 purchases the CD-ROM 43 manufactured as described above, and installs it into a CD-ROM system of the user terminal 44. Then, the user activates the sales guidance program stored on the CD-ROM 43, and selects the desired software. (Internally, the ID of the desired software is selected at this point.)

When the desired software is selected, the user terminal 44 is connected with the key center 1 through the public network. Then, the user terminal 44 obtains the AP key K1 from the key center 45 according to the cipher key distribution method of the above embodiment, and reads out and deciphers the enciphered software at the CD-ROM system. Here, in this example, the ID of the software selected by the user is enciphered along with the random number K3 by using the public key K2e at the enciphering device 61 of the user terminal as shown in FIG. 4, and the resulting AP key request signal is transmitted to the key center 45. At the key center 45, using the ID of the requested software obtained by deciphering the received AP key request signal, the corresponding AP key K1 is retrieved from the AP key database 14 of the key center as shown in FIG. 5, and the retrieved AP key K1 is given to the user terminal 44 by the procedure of FIG. 6 for example, while charging the appropriate fee to this user.

As described, according to the present invention, the random numbers are generated at both of the user terminal and the key center, so that the signals between the key center and the user terminal can be changed in each access, and it is possible to check whether the user terminal is a fake one or not by enciphering the random number generated at the key center and making the user terminal to return this random number by correctly deciphering it. In addition, by inputting the random number into the multi-value function at the user terminal side, it is possible to prevent the signal between the key center and the user terminal from being identified even when the random number generation source is identified, so that it becomes impossible to draw up a block diagram of the terminal program function in order to analyze the processing content of the terminal program.

Consequently, in distributing the cipher key from the key center to the user terminal, the cipher key can be protected against the tapping of the intermediate communication line by a malicious terminal user, while it is difficult to extract any significant hint for analysis of the terminal program from the tapping result, so as to realize a protection against the falsification of the terminal program, and therefore it becomes possible to realize a safe cipher key distribution and an effective prevention of the illegitimate use and the illegitimate charging by means of the production of the dummy key center or user terminal.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of cipher key distribution in a system formed by a key center having a cipher key to be distributed and a plurality of user terminals connected with the key center through a public network, the method comprising the steps of:

(a) transmitting a key request signal containing a first random number generated at each user terminal, from each user terminal to the key center, so as to indicate the cipher key required at each user terminal to the key center;

(b) transmitting a terminal check signal containing a second random number generated at the key center, from the key center to each user terminal;

(c) transmitting a terminal response signal containing the second random number and a value based on the first random number obtained according to the first random number generated at each user terminal and the second random number contained in the terminal check signal, from each user terminal to the key center;

(d) checking the second random number and the value based on the first random number contained in the terminal response signal at the key center, according to the second random number generated at the key center and the first random number contained in the key request signal, so as to confirm a legitimacy of an access from each user terminal; and (e) transmitting a key distribution signal containing the cipher key requested by the key request signal, from the key center to each user terminal, only when the legitimacy of the access from each user terminal is confirmed at the step (d).

2. The method of claim 1, wherein at the step (a), the key request signal is produced at each user terminal by enciphering the first random number by using a public key, and the key center obtains the first random number by deciphering the key request signal by using a secret key corresponding to the public key.

3. The method of claim 1, wherein at the step (b), the terminal check signal is produced at the key center by enciphering the second random number by using the first random number contained in the key request signal, and each user terminal obtains the second random number by deciphering the terminal check signal by using the first random number generated at each user terminal.

4. The method of claim 1, wherein at the step (c), the terminal response signal is produced at each user terminal by enciphering the second random number contained in the terminal check signal and the value based on the first random number by using a public key, and the key center obtains the second random number and the value based on the first random number contained in the terminal response signal by deciphering the terminal response signal by using a secret key corresponding to the public key.

5. The method of claim 1, wherein at the step (c), the value based on the first random number is a multi-value function output obtained at each user terminal by inputting the first random number into a multi-value function and selecting one of multiple outputs of the multi-value function.

6. The method of claim 5, wherein at the step (d), the value based on the first random number is checked at the key center by inputting the first random number contained in the key request signal into the multi-value function and comparing the value based on the first random number contained in the terminal response signal with the multiple outputs of the multi-value function.

7. The method of claim 1, wherein at the step (c), the value based on the first random number is the first random number itself.

8. The method of claim 1, wherein at the step (e), the key distribution signal is produced at the key center by enciphering the cipher key by using the second random number and the value based on the first random number contained in the terminal response signal, and each user terminal obtains the cipher key by deciphering the key distribution signal by using the second random number contained in the terminal check signal and the value based on the first random number obtained at each user terminal.

9. The method of claim 1, wherein at the step (e), the key distribution signal is produced at the key center by enciphering the cipher key by using any one of the first random number contained in the key request signal, the second random number generated at the key center, and the value based on the first random number contained in the terminal response signal, and each user terminal obtains the cipher key by deciphering the key distribution signal by using any one of the first random number generated at each user terminal, the second random number contained in the terminal check signal, and the value based on the first random number obtained at each user terminal.

10. The method of claim 1, wherein the steps (a), (b), (c), (d), and (e) include the steps of:

(a1) generating the first random number and enciphering the first random number by using a public key to produce the key request signal at each user terminal;

(a2) transmitting the key request signal produced at the step (a1) from each user terminal to the key center;

(a3) obtaining the first random number at the key center by deciphering the key request signal transmitted at the step (a2) by using a secret key corresponding to the public key;

(b1) generating the second random number and enciphering the second random number by using the first random number obtained at the step (a3) to produce the terminal check signal at the key center;

(b2) transmitting the terminal check signal produced at the step (b1) from the key center to each user terminal;

(b3) obtaining the second random number at each user terminal by deciphering the terminal check signal transmitted at the step (b2);

(c1) obtaining a multi-value function output by inputting the first random number into a multi-value function and selecting one of multiple outputs of the multi-value function at each user terminal;

(c2) enciphering the second random number obtained at the step (b3) and the multi-value function output obtained at the step (c1) by using the public key to produce the terminal response signal at each user terminal;

(c3) transmitting the terminal response signal produced at the step (c2) from each user terminal to the key center;

(c4) obtaining the second random number and the multi-value function output contained in the terminal response signal at the key center by deciphering the terminal response signal transmitted at the step (c3) by using the secret key;

(d1) checking whether the second random number obtained at the step (c4) coincides with the second random number generated at the step (b1) at the key center;

(d2) checking whether the multi-value function output obtained at the step (c4) is a true output of the multi-value function at the key center by inputting the first random number obtained at the step (a3) into the multi-value function and comparing the multi-value function output obtained at the step (c4) with the multiple outputs of the multi-value function; (d3) confirming the legitimacy of the access from each user terminal at the key center when the step (d1) confirms that the second random number deciphered at the step (c4) coincides with the second random number generated at the step (b1) and the step (d2) confirms that the multi-value function output deciphered at the step (c4) is the true output of the multi-value function;

(e1) enciphering the cipher key by using the second random number and the multi-value function output obtained at the step (c4) to produce the key distribution signal at the key center;

(e2) transmitting the key distribution signal produced at the step (e1) from the key center to each user terminal; and (e3) obtaining the cipher key at each user terminal by deciphering the key distribution signal transmitted at the step (e2) by using the second random number obtained at the step (b3) and the multi-value function output obtained at the step (c1).

11. A cipher key distribution system, comprising:

a key center having a cipher key to be distributed;

a plurality of user terminals connected with the key center through a public network;

key request means, provided in each user terminal, for transmitting a key request signal containing a first random number generated at each user terminal, from each user terminal to the key center, so as to indicate the cipher key required at each user terminal to the key center;

terminal check means, provided in the key center, for transmitting a terminal check signal containing a second random number generated at the key center, from the key center to each user terminal;

terminal response means, provided in each user terminal, for transmitting a terminal response signal containing the second random number and a value based on the first random number obtained according to the first random number generated at each user terminal and the second random number contained in the terminal check signal, from each user terminal to the key center;

check means, provided in the key center, for checking the second random number and the value based on the first random number contained in the terminal response signal, according to the second random number generated at the key center and the first random number contained in the key request signal, so as to confirm a legitimacy of an access from each user terminal; and key distribution means, provided in the key center, for transmitting a key distribution signal containing the cipher key requested by the key request signal, from the key center to each user terminal, only when the legitimacy of the access from each user terminal is confirmed by the check means.

12. The system of claim 11, wherein the key request means produces the key request signal by enciphering the first random number by using a public key, and the key center obtains the first random number by deciphering the key request signal by using a secret key corresponding to the public key.

13. The system of claim 11, wherein the terminal check means produces the terminal check signal by enciphering the second random number by using the first random number contained in the key request signal, and each user terminal obtains the second random number by deciphering the terminal check signal by using the first random number generated at each user terminal.

14. The system of claim 11, wherein the terminal response means produces the terminal response signal by enciphering the second random number contained in the terminal check signal and the value based on the first random number by using a public key, and the key center obtains the second random number and the value based on the first random number contained in the terminal response signal by deciphering the terminal response signal by using a secret key corresponding to the public key.

15. The system of claim 11, wherein the terminal response means obtains a multi-value function output as the value based on the first random number by inputting the first random number into a multi-value function and selecting one of multiple outputs of the multi-value function.

16. The system of claim 15, wherein the check means checks the value based on the first random number by inputting the first random number contained in the key request signal into the multi-value function and comparing the value based on the first random number contained in the terminal response signal with the multiple outputs of the multi-value function.

17. The system of claim 11, wherein the terminal response means uses the first random number itself as the value based on the first random number.

18. The system of claim 11, wherein the key distribution means produces the key distribution signal by enciphering the cipher key by using the second random number generated at the key center and the value based on the first random number contained in the terminal response signal, and each user terminal obtains the cipher key by deciphering the key distribution signal by using the second random number contained in the terminal check signal and the value based on the first random number obtained at each user terminal.

19. The system of claim 11, wherein the key distribution means produces the key distribution signal by enciphering the cipher key by using any one of the first random number contained in the key request signal, the second random number generated at the key center, and the value based on the first random number contained in the terminal response signal, and each user terminal obtains the cipher key by deciphering the key distribution signal by using any one of the first random number generated at each user terminal, the second random number contained in the terminal check signal, and the value based on the first random number obtained at each user terminal.

20. A cipher key distribution system, comprising:

a key center having a cipher key to be distributed; and a plurality of user terminals connected with the key center through a public network;

wherein each user terminal includes:

means for transmitting a key request signal to the key center, receiving a terminal check signal from the key center in response to the key request signal, transmitting a terminal response signal to the key center in response to the terminal check signal, and receiving a key distribution signal from the key center in response to the terminal response signal;

means for generating a first random number;

means for producing the key request signal containing the first random number, for indicating the cipher key required at each user terminal;

means for obtaining a second random number from the terminal check signal received from the key center;

means for obtaining a value based on the first random number;

means for producing the terminal response signal containing the second random number contained in the terminal check signal and the value based on the first random number; and means for obtaining the cipher key from the key distribution signal received from the key center; and wherein the key center includes:

means for receiving the key request signal from each user terminal, transmitting the terminal check signal to each user terminal in response to the key request signal, receiving the terminal response signal from each user terminal in response to the terminal check signal, and transmitting the key distribution signal to each user terminal in response to the terminal response signal;

means for obtaining the first random number from the key request signal received from each user terminal;

means for generating the second random number;

means for producing the terminal check signal containing the second random number;

means for obtaining the value based on the first random number and the second random number from the terminal response signal received from each user terminal;

means for checking the second random number and the value based on the first random number contained in the terminal response signal, according to the second random number generated at the key center and the first random number contained in the key request signal, so as to confirm a legitimacy of an access from each user terminal; and means for producing the key distribution signal containing the cipher key requested by the key request signal, only when the legitimacy of the access from each user terminal is confirmed by said means for checking.

* * * * *